(12) United States Patent
Suzuki et al.

(10) Patent No.: US 7,550,042 B2
(45) Date of Patent: Jun. 23, 2009

(54) METHOD AND APPARATUS FOR CRYSTALLIZATION

(75) Inventors: Shinji Suzuki, Tokyo (JP); Yoshihito Okubo, Ibaraki (JP)

(73) Assignee: Sumitomo Chemical Company Limited, Tokyo (JP)

( * ) Notice: Subject to any disclaimer, the term of this patent is extended or adjusted under 35 U.S.C. 154(b) by 215 days.

(21) Appl. No.: 10/540,525

(22) PCT Filed: Dec. 25, 2003

(86) PCT No.: PCT/JP03/16740

§ 371 (c)(1),
(2), (4) Date: Apr. 14, 2006

(87) PCT Pub. No.: WO2004/060525

PCT Pub. Date: Jul. 22, 2004

(65) Prior Publication Data

US 2006/0210459 A1 Sep. 21, 2006

(30) Foreign Application Priority Data

Dec. 27, 2002 (JP) ............................. 2002-379264

(51) Int. Cl.
C30B 29/54 (2006.01)
(52) U.S. Cl. .................. 117/68; 17/69; 17/70; 17/932; 17/934
(58) Field of Classification Search .................. 117/68, 117/69, 70, 932, 934
See application file for complete search history.

(56) References Cited

U.S. PATENT DOCUMENTS

| 6,413,984 B1 * | 7/2002 | Philippo et al. ............. 514/314 |
| 2005/0070738 A1 * | 3/2005 | Isotani ....................... 562/608 |

FOREIGN PATENT DOCUMENTS

| JP | 41-12304 B2 | 7/1966 |
| JP | 1-102033 A | 4/1989 |
| JP | 7-17902 A | 1/1995 |
| JP | 2000-53617 A | 2/2000 |

OTHER PUBLICATIONS

Wang et al., Ind. Eng. Chem. Res., vol. 39, pp. 2101-2104, (2000).

* cited by examiner

*Primary Examiner*—Robert M Kunemund
(74) *Attorney, Agent, or Firm*—Birch, Stewart, Kolasch & Birch, LLP

(57) ABSTRACT

The present invention is a method which is capable of producing crystals having a mean particle diameter larger than conventionally produced crystals, by carrying out a crystallizing method so-called neutralization crystallization. An ingredient organic acid salt solution is supplied as a reaction initial liquid in a reaction vessel (2). An acid is supplied via a dropping tube (10) to the ingredient organic acid salt solution, so that crystals of a targeted organic acid is precipitated. Then, the base is supplied in the reaction vessel (2) via a dropping tube (15), thereby partially dissolving the crystals being precipitated. The acid is further supplied from the dropping tube (10) for carrying out the crystallization.

13 Claims, 2 Drawing Sheets

METHOD AND APPARATUS FOR CRYSTALLIZATION

TECHNICAL FIELD

The present invention relates to a method for crystallizing an organic acid, in which an organic acid is crystallized by adding an acid to a solution of an organic acid salt. The present invention also relates to a crystallizing apparatus suitable for use in such a method.

BACKGROUND ART

In general, a non water-soluble or a hardly water-soluble organic acid such as a carboxylic acid is crystallized by using a reactive crystallization so-called "neutralization crystallization" in which the organic acid is crystallized by reacting its salt with an acid in the presence of water.

An example of the neutralization crystallization is a method in which crystals of a crystalline organic acid, such as adipic acid or nicotinic acid, are produced by adding an acid to a water solution of a water-soluble salt of the crystalline organic acid (See, for example, Reference 1: Fang Wang and 1 other, "Monitoring pH Swing Crystallization of Notice Acid by the Use of Attenuated Total Reflection Fourier Transform Infrared Spectrometry", "Ind. Eng. Chem. Res. Vol. 39, No. 6, 2000", p. 2101-2104).

In the foregoing neutralization crystallization, the crystals of the foregoing organic compound are precipitated by a) dropping an acid on a surface of an alkaline water solution of the foregoing organic compound in a container by using a pump or the like, or b) dropping the acid into the alkaline water solution of the foregoing organic compound in the container by using a dipping tube.

According to the foregoing Reference 1, as hydrochloric acid is being dropped into a water solution of sodium nicotinate, the solution transits from an unsaturated state (I) in which nicotinic acid is not yet saturated, to a supersaturated state (II) in which crystals are not precipitated even though nicotinic acid being dissolved exceeds a saturation point of nicotinic acid. Then, as hydrochloric acid is being further dropped into the solution, a rapid desupersaturation (III) of the solution occurs due to crystallization, thereby resulting in a saturated state (IV) in which the crystals are precipitated.

However, the inventors of the present invention found reaction of mono-sodium adipate with hydrochloric acid according to the method described in Reference 1 only gave such adipic acid crystals whose mean particle diameter of the crystals obtained was as small as 129 μm, and bulk density of the crystals was as small as 267 kg/m$^3$.

As described, the conventional method of neutralization crystallization only produces crystals whose mean particle diameter and bulk density are small. This causes such a problem that, for example, long time is needed for a filtration for filtering out the crystals obtained by the crystallization.

In view of the foregoing problems, the present invention was made, and it is an object of the present invention to provide a crystallizing method for producing, in the method so-called neutralization crystallization, crystals whose mean particle diameter is larger than a conventional mean particle diameter of the crystals.

DISCLOSURE OF INVENTION

After a devoted study for achieving the foregoing object, the present inventors had come to a conclusion that one of reasons why conventional neutralization crystallization can obtain only crystals whose mean particle diameter is small is because production of new crystal nuclei occurs dominantly during a saturation state (IV), and especially during a rapid desupersaturation (III) due to crystallization. In other words, the present inventors had found from the study that only the crystals whose mean particle diameter is small are obtained, because most of an ingredient compound for use in the crystallizing reaction is precipitated as the crystal nuclei, and the ingredient compound is not used in crystal growth.

In order to solve the foregoing problem, the present inventors had conducted a study for increasing the percentage of the compound used in the crystal growth. As a result, the present inventors had found that the crystal growth can be attained by the following arrangement: a part of minute crystals derived from the crystal nuclei produced by dropping the acid are dissolved by using a base for converting the minute crystals into salt, and then, this salt can be used for the crystal growth by reacting the salt with the acid again.

In a crystallizing method of the present invention, a pH rarely changes in the presence of crystals, even if the acid or the base is added. This is because, in the crystallizing method of the present invention, adding of the base only converts the organic acid into salt, there by causing no significant change in the pH. In the neutralization crystallization in which crystallization is carried out by adding the acid so that the pH of the reaction liquid becomes below a neutral point or the like, it appears that controlling of the foregoing crystallizing reaction is impossible, because the pH is hardly changed once the crystals are precipitated, even if the base is added. However, the present inventors had found that the foregoing reaction occurs by adding the base while the crystals are being precipitated, and that the foregoing crystallizing reaction can be more effectively controlled by controlling a ratio of the added acid to the added base. In the present invention, an amount of the acid needed for the crystallization varies depending on the amount of the base being used.

More specifically, a method of the present invention for crystallizing an organic acid includes the steps of: a) converting a part of organic acid crystals into an organic acid salt and dissolving the organic acid salt by adding a base to a liquid containing organic acid crystals; and b) adding an acid to the organic acid salt dissolved liquid.

With the foregoing method, the amount of the minute crystals is reduced. Further, a percentage of compound for use in the crystal growth is increased, thereby enabling an efficient crystal growth. As a result, crystals whose mean particle diameter is large, and whose bulk density is high are stably obtained with highly constant property.

Further, in order to solve the foregoing problems, a method of the present invention for crystallizing an organic acid may include the steps of: a) precipitating at least a part of total of the organic acid crystals that are precipitable, by adding an acid to a solution of an organic acid salt; b) converting a part of the organic acid crystals into the organic acid salt and dissolving the organic acid salt by adding a base to a liquid containing the organic acid crystals; and c) adding the acid to the organic acid salt dissolved liquid.

With the foregoing method, the amount of the minute crystals is reduced. Further, a percentage of compound for use in the crystal growth is increased, thereby enabling an efficient crystal growth. As a result, crystals whose mean particle diameter is large, and whose bulk density is high are stably obtained with highly constant property.

Further, in the method of the present invention for crystallizing the organic acid, it is preferable that M defined below satisfy the following formula:

$$Q/(P \times Z) - 0.3 \leq M/(P \times Z) \leq Q/(P \times Z) - 0.03,$$

where:
M is a value obtained by dividing, by an equivalent weight (g) of the base, an amount (g) of the base being added;
Q is a value obtained by dividing, by an equivalent weight (g) of the acid, an amount (g) of the acid being added before the base is added;
P is an amount (g) of the organic acid salt in the solution of the organic acid salt before the initial addition of the acid; and
Z is a value obtained by dividing a molecular weight of the organic acid salt in the solution of the organic acid salt before the initial addition of the acid, by the number of anionic functional groups included in one molecule of the organic acid salt.

The foregoing method is highly effective since the method gives a longer period for the crystal growth.

Further, it is preferable that an amount of the organic acid crystals remained after the addition of the base be from 1 to 30 wt. % of the total of the organic acid crystals that are precipitable.

The foregoing method is highly effective since, the method gives a longer period for the crystal growth.

Further, in order to solve the foregoing problems, a method of the present invention for crystallizing an organic acid by adding an acid to a solution of an organic acid salt may be such that, after organic acid crystals starts being precipitated by the addition of the acid, the addition of the acid is carried out while a part of the organic acid crystals is being converted into the organic acid salt and the organic acid salt is being dissolved by addition of a base to a liquid containing the organic acid crystals.

If the degree of supersaturation with respect to the targeted organic acid is extremely small, and the crystallization immediately occurs nearby the region to which the acid is being dropped, and the production of the crystal nuclei becomes dominant. This causes a poor crystal growth. In such a case, the foregoing method stably increases the particle diameter of the crystals with highly constant property by dissolving the minute crystals produced in the production of the new crystal nuclei, so that the minute crystals decreases, while the amount of the organic acid salt for use in the crystal growth increases.

In the foregoing method for crystallizing the organic acid, it is preferable that M/(P×Z) defined below satisfy the following formula:

$$Q/(P \times Z) - 0.3 \leq M/(P \times Z) \leq Q/(P \times Z) - 0.03,$$

where:
M is a value obtained by dividing, by an equivalent weight (g) of the base, an amount (g) of the base being added;
Q is a value obtained by dividing, by an equivalent weight (g) of the acid, an amount (g) of the acid being added before the base is added;
P is an amount (g) of the organic acid salt in the solution of the organic acid salt before the initial addition of the acid; and
Z is a value obtained by dividing a molecular weight of the organic acid salt in the solution of the organic acid salt before the initial addition of the acid, by the number of anionic functional groups included in one molecule of the organic acid salt.

Further, the method for crystallizing the organic acid is preferably so adapted that a) the acid and the base are respectively added in reaction vessels being connected with each other, while the liquid in the reaction vessels is circulated between the reaction vessels; and b) an amount of the base is so adjusted that a value resulting from a formula L×M/(T×F× P×Z) is 0.5 or more and less than 1.5:

where:
P is an amount (g) of the organic acid salt in the solution of the organic acid salt before the initial addition of the acid;
Z is a value obtained by dividing a molecular weight of the organic acid salt in the solution of the organic acid salt before the initial addition of the acid, by the number of anionic functional groups included in one molecule of the organic acid salt;
M is a value obtained by dividing, by an equivalent weight (g) of the base, an amount (g) of the base being added;
T is an adding period (min);
F is an amount of the liquid circulated per unit period (ml/min); and
L is a logarithmic average (ml) of a maximum amount and a minimum amount of the liquid in this system.

Further, in order to solve the foregoing problems, a method of the present invention for producing organic acid crystals includes the steps of: a) converting a part of the organic acid crystals into an organic acid salt and dissolving the organic acid salt by adding a base to a solution of organic acid crystals; b) adding an acid to the organic acid salt dissolved liquid; and c) isolating the organic acid crystals from the reaction liquid.

With the foregoing method, the amount of the minute crystals is reduced. Further, a percentage of compound for use in the crystal growth is increased, thereby enabling an efficient crystal growth. As a result, organic acid crystals whose mean particle diameter is large, and whose bulk density is high are stably obtained with highly constant property.

Further, a method of the present invention for producing organic acid crystals may include the steps of: a) precipitating at least a part of total of the organic acid crystals that are precipitable, by adding an acid to a liquid containing an organic acid salt; b) converting a part of the organic acid crystals into the organic acid salt and dissolving the organic acid salt by adding a base to a liquid containing the organic acid crystals; c) adding the acid to the organic acid salt dissolved liquid; and d) isolating the organic acid crystals from the reaction liquid.

With the foregoing method, the amount of the minute crystals is reduced. Further, a percentage of compound for use in the crystal growth is increased, thereby enabling an efficient crystal growth. As a result, organic acid crystals whose mean particle diameter is large, and whose bulk density is high are stably obtained with highly constant property.

Further, in order to solve the foregoing problems, a crystallizing apparatus of the present invention includes: a) a crystallizing-reaction vessel; b) an acid supplying section for supplying an acid to the crystallizing-reaction vessel; and c) a base supplying section for supplying a base to the crystallizing-reaction vessel, the acid supplying section and the base supplying section being so arranged that the acid and the base are respectively supplied to positions of the crystallizing-reaction vessel, the positions being located at a distance from each other.

With the foregoing configuration, crystals whose mean particle diameter is large, and whose bulk density is high can be stably obtained with highly constant property.

Further, a crystallizing apparatus of the present invention may include: a) a first reaction vessel having an acid supplying section; b) a second reaction vessel having a base supplying section; and c) a liquid circulating section connecting the first reaction vessel with the second reaction vessel, the liquid circulating section being for circulating reaction liquid between the first reaction vessel and the second reaction vessel.

With the foregoing configuration, crystals whose mean particle diameter is large, and whose bulk density is high can be stably obtained with highly constant property.

BEST MODE FOR CARRYING OUT THE INVENTION

Figure 1:
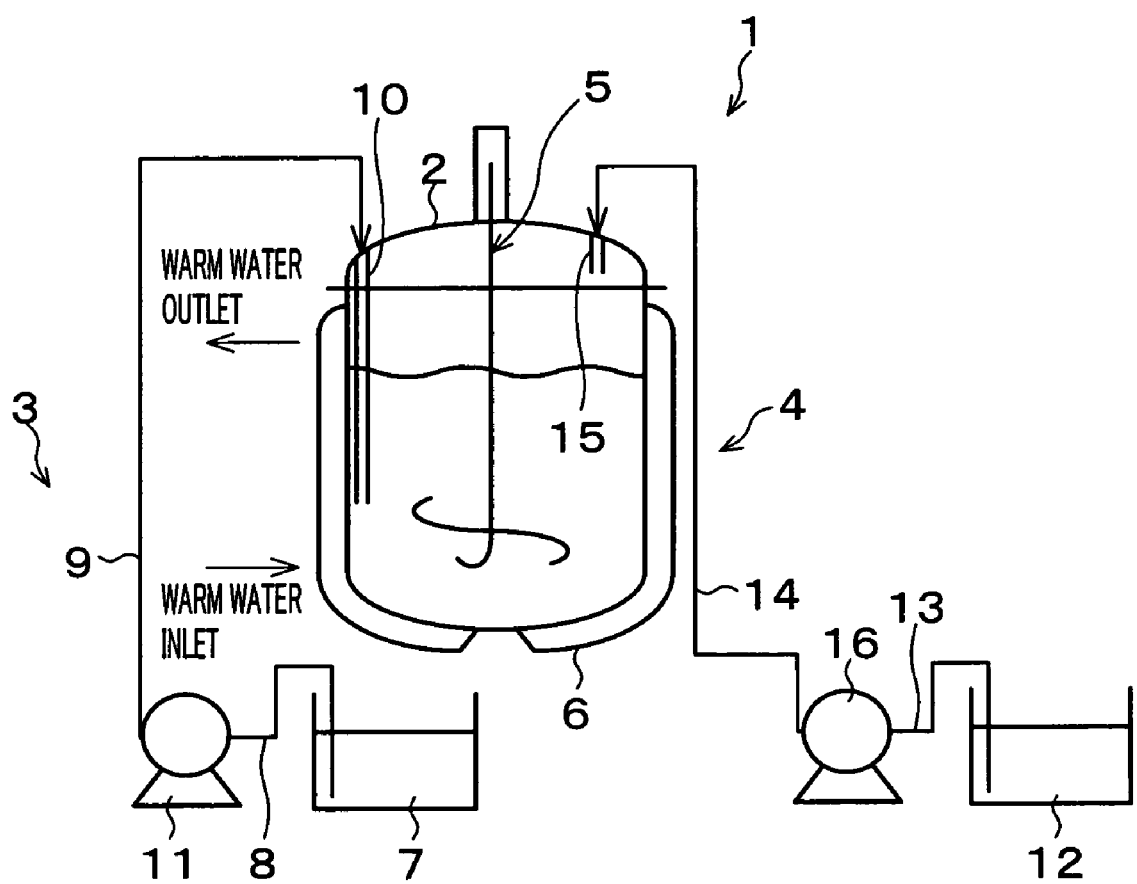
FIG. 1 is a schematic view illustrating a configuration of a crystallizing apparatus for use in a crystallizing method of the present invention.

The following describes an embodiment of the present invention.

A crystallizing method of the present embodiment is a crystallizing method in which crystals are precipitated by adding an acid to a solution of an organic acid salt. In the method, part of organic acid crystals being precipitated by reacting the organic acid salt with the acid is dissolved by adding a base. The organic acid salt thus dissolved is again reacted with the acid, in the presence of the remaining organic acid crystals.

More specifically, the crystallizing method of the present invention is the method in which a) the organic acid salt is an ingredient compound for use in a crystallization; i.e., a starting substance (hereinafter referred to as ingredient organic acid salt where appropriate) for use in a crystallizing reaction, and b) the organic acid salt is reacted with the acid by adding the acid to a solution (preferably a water solution) of the ingredient organic acid salt, thereby to produce crystals of targeted organic acid. In this method, at least a part of the targeted organic acid is crystallized by reacting, with the acid, the ingredient organic acid salt used for the crystallization. Then, by using the base, a part of those organic acid crystals precipitated by the crystallization is converted into the organic acid salt, thereby being dissolved in the liquid. Then, in the presence of the remaining crystals, the organic acid salt in the system is reacted again with the acid by adding the acid to the organic acid salt dissolved liquid.

The crystallizing method of the present embodiment is roughly classified into the following two methods.

A first method is a method (1) in which a forward reaction and a backward reaction are separately carried out. In the forward reaction from an ingredient to a targeted substance an ingredient organic acid salt is reacted with an acid, so that a targeted organic acid is crystallized. On the contrary, in the backward reaction from the targeted substance to the ingredient, the organic acid crystals precipitated are dissolved again by using a base, so that the crystals are converted back into the organic acid salt. In the method (1), the forward reaction and the backward reaction are alternately carried out, so that the reactions are carried out non-simultaneously. For example, in the foregoing method, by alternately carrying out these reactions in a single container, the forward reaction and the backward reaction are carried out in a same region, but non-simultaneously. In the foregoing method, the forward reaction and the backward reaction may be alternately carried out by a) replacing a reaction liquid in another container after the forward reaction or the backward reaction, and then b) carry out the next reaction. For example, the reaction liquid may be replaced in a separate container after the forward reaction, and then carry out the backward reaction in the separate container.

A preferred example of the first method is a method for crystallizing the organic acid, the method including the steps of: crystallizing at least a part of the targeted organic acid by adding the acid to the solution of the ingredient organic acid salt; converting a part of the organic acid crystals into the organic acid salt and dissolving the organic acid salt by adding the base to a liquid containing the organic acid crystals; and adding the acid to the organic acid salt dissolved liquid. Specifically, the preferred example of the first method is the crystallizing method for precipitating the organic acid crystals by adding the acid to the solution of the ingredient organic acid salt. This method is arranged such that after precipitation of at least a part of all of the crystals that are precipitable when the organic acid salt is wholly reacted with the acid, the base is added to the liquid containing the organic acid crystals. As a result of the addition of the base, a part of the organic acid crystals is converted into the organic acid salt and the organic acid salt is dissolved. After that, the acid is added to the organic acid salt dissolved liquid, so as to cause the organic acid salt to react with the acid again in the presence of the remaining organic acid crystals. More specifically, in the method, the organic acid salt is used as the ingredient compound. This ingredient organic acid salt reacts with the acid by adding the acid to the solution (preferably the water solution) of the organic acid salt, thereby crystallizing at least a part of the corresponding organic acid. To these organic acid crystals precipitated by the crystallization, the base is added so as to react the organic acid crystals with the base. This converts a part of the organic acid crystals into the organic acid salt and dissolves the organic acid salt. Then, the acid is added to the organic acid salt dissolved liquid, so as to react the organic acid salt again with the acid in the presence of the remaining crystals. This causes crystal growth by using the remaining crystals as cores (seed crystals).

In other words, the first method is as follows. The acid is dropped, in the presence of water, into the ingredient organic acid salt for use in the crystallization (i.e., neutralization crystallization) of the present embodiment. As the acid is being dropped, the solution transits from an unsaturated state (I) in which the targeted organic acid is not yet saturated, to a supersaturated state (II) in which the targeted organic acid is not crystallized out even though the concentration of the organic acid surpasses its saturation point. Then, as the acid is further dropped into the liquid, a rapid desupersaturation (III) occurs due to the crystallization, thereby resulting in a saturated state (IV). Once the liquid arrives at the saturated state (IV), (V) the base is added at an arbitrary point, so that an amount of the acid excluding an amount being neutralized by the base returns to the point of (II), thus dissolving minute crystals (relatively small crystals amongst the crystals being precipitated) precipitated during the (III) and the (IV). Then, (VI) the acid is dropped again so as to cause the crystal growth by using the organic acid dissolved in the liquid.

On the other hand, a second method is a method in which the forward reaction and the backward reaction are simultaneously carried out in a parallel manner. Examples of the second method are a method (2) in which the backward reaction is carried out while the forward reaction is carried out in the same container, and a method (3) in which the forward reaction and the backward reaction are simultaneously carried out in separate regions in a parallel manner. In the method (3), containers being connected with each other are provided, and an acid and a base are added into the respective containers while liquid in the containers is circulated between the containers. On the other hand, in the method (2), the acid and the base are respectively supplied to positions by dropping or in another way, the positions located at a distance from each other. This creates, in the same container, a region (crystal precipitating area) for carrying out the forward reaction, and a region (partially dissolving area) for carrying out the backward reaction. Thus, the forward reaction and the backward reaction are carried out in a heterogeneous state.

More specifically, the second method is a method for crystallizing an organic acid, in which the organic acid is crystallized by adding the acid to a solution of an ingredient organic acid salt. In the method, after the addition of the acid initiates the crystallization of the organic acid, the acid is kept being added while the base is added to the reaction system, so that a part of the organic acid crystals are dissolved. That is, the base is added to the liquid containing the organic acid crystals which are precipitated by reacting the organic acid salt with the acid. This causes the organic acid salt to react with the acid, while the crystals are partially dissolved again.

In other words, in the second method, the base is added at the same time the acid is being supplied to the organic acid salt. Minute crystals, which are formed on new crystal nuclei produced during the saturation state (IV), are mainly dissolved by the base. The crystal growth occurs by using the organic acid dissolved by adding the excessive acid.

Of the foregoing two methods, the first method is particularly suitable for a case where the rapid desupersaturation (III) takes place due to the precipitation of the crystals after the supersaturated state in which the crystals are not precipitated even though the target organic acid is dissolved beyond its saturation point, especially in a case in which the crystals are precipitated suddenly and rapidly during the dropping of the acid due to a large level of supersaturation.

In the case in which the crystallization suddenly and rapidly takes place during the dropping of the acid after the supersaturation is maintained and no crystals are precipitated out by then, e.g. at beginning of the dropping of the acid or immediately before end of the dropping of the acid, the production of the crystal nuclei is dominant and the crystal growth is difficult. Due to this, the particle diameter of the crystals obtained tends to be small.

For this reason, by adding the base at an arbitrary point (IV) after the crystallization; i.e., after the rapid desupersaturation (III), the crystals precipitated at the (IV) are dissolved in such a manner that crystals having a smaller particle diameter are dissolved before crystal having a larger particle diameter. This is because, the crystals having a smaller diameter has a larger specific surface area. Accordingly, the minute crystals amongst the crystals precipitated at the (IV) are dissolved. Since the crystals are already existing in the reaction vessel, when the acid is dropped again at (V), the crystal growth easily occurs by using the remaining crystals as the cores (seed crystals).

More specifically, for example, if a) the degree of supersaturation of the organic acid is extremely large, and b) the supersaturation state lasts long, primary nuclei having no crystal growth are suddenly and rapidly precipitated, if organic acid crystals are precipitated, for the first time, when an amount of the acid being dropped reaches such an amount that $Q'/(P \times Z)$ is 0.8, where:
P is an amount (g) of the ingredient organic acid salt provided;
Z is a value obtained by dividing a molecular weight of the organic acid salt by the number of anionic functional groups included in a single molecule of the organic acid salt; and
Q' is a value obtained by dividing, by an equivalent weight (g) of the acid, an amount (g) of the added acid.

In this case, only remaining 20% of the organic acid salt can be used for the crystal growth of the crystals being precipitated. By dissolving 80% of the crystals precipitated, an amount of the organic acid salt contained in the reaction liquid increases, while 20% of the crystals still remain. Accordingly, a ratio of the organic acid salt with respect to the crystals being precipitated significantly increases, compared with before dissolving the crystals. As such, the amount of the organic acid salt for use in the crystal growth significantly increases. Here, by dropping the acid of an amount that corresponds to the amount of the organic acid salt remaining, the crystal growth occurs by using the remaining crystals as the cores (seed crystals). As a result, large crystals are stably obtained with highly constant properties.

That is, in the case in which the crystal growth is poor due to the dominance of the production of the crystal nuclei during the dropping of the acid because of the sudden and rapid crystallization resulted from the extremely large degree of supersaturation with respect to the targeted organic acid, the first method in which the crystals being precipitated are partially dissolved causes the amount of the minute crystals to decrease while increasing the amount of the organic acid salt available for the crystal growth. As a result, the particle diameter of the crystals is stably increased with highly constant properties.

Accordingly, the first method is suitable for crystallizing an organic acid which can have a relatively large degree of supersaturation, such as nicotinic acid and salicylic acid.

The first method is suitable for a compound wherein, during the (II), $Q'/(P \times Z)$ is usually within a range of 0.1 to 1.0, preferably 0.3 to 1.0.

On the other hand, it is preferable to use the second method in a case where the degree of the supersaturation is extremely small and the crystallization immediately occurs nearby a dropping point of the acid. This is because in such a case new crystal nuclei, i.e., new minute crystals are successively produced while the acid is dropped.

That is, in the case where the crystal growth is poor due to the dominance of the production of the crystal nuclei because the crystals are immediately precipitated in the vicinity of the dropping point of the acid due to the extremely small degree of supersaturation with respect to the targeted organic acid, the second method in which the minute crystals being formed on the new crystal nuclei are partially dissolved by the base while the crystals being precipitated by the acid causes the amount of the minute crystals to decrease while increasing the amount of the organic acid salt available for the crystal growth. As the result, the crystals of a large particle diameter is stably obtained with highly constant properties.

In use of the second method as well, the amount of the acid is constantly kept in excess with respect to the amount of the base. In other words, the acid is dropped in such an amount that an amount of the acid not neutralized surpasses that of the acid neutralized by the base. In this way, since the crystals having a smaller particle diameter have a larger specific area surface, only the minute crystals being newly produced are completely dissolved. On the other hand, the remaining crystals, which are not being completely dissolved, keep growing by reacting with the acid. By repeating this process, even if a)

the degree of supersaturation with respect to the targeted organic acid is extremely small, and b) the crystallization immediately occurs nearby the region to which the acid is being dropped, the amount of the minute crystals decreases while the amount of the ingredient compound available for the crystal growth increases, thereby increasing the particle diameter of the crystals for use as the cores.

Usually, a large amount of the minute crystals are precipitated in the (III), in a case where the (II) occupies a large percentage of the acid-dropping period. Accordingly, in this case, the first method is more effective than the second method in increasing the particle diameter. On the contrary, the (IV) occupies a larger percentage of the acid-dropping period, in a case where the (II) occupies a small percentage of the acid-dropping period; for example, in a case where the crystals are precipitated immediately after the acid is dropped. In this case, the second method is more effective than the first method, in increasing the particle diameter. The second method is always effective except in a case where the (IV) never occurs during the acid-dropping period.

Accordingly, the second method is suitable for neutralization crystallization in general. That is, the second method is suitable for crystallizing not only a compound, such as adipic acid, which can have a relatively large degree of supersaturation, but also a compound, such as biotin, which has relatively small degree of supersaturation.

The second method is suitable for an organic acid wherein, during the (II), $Q'/(P \times Z)$ is usually 0.4 or less, preferably 0.1 or less.

An organic acid to which the present invention can be applied is a compound whose melting point is 50° C. or higher, and which contains a carboxyl group, a sulfonic group, a sulfenic group, a phosphonic group, a phenolic hydroxyl group, or the like. Such a compound can be: an aliphatic carboxylic acid such as adipic acid, palmitic acid, stearic acid, and biotin; an aromatic carboxylic acid such as benzoic acid, nicotinic acid and salicylic acid; an aromatic sulfonic acid such as benzene sulphonic acid; an aromatic sulfenic acid such as phenylsulfenic acid; an aromatic phosphonic acid such as phenylphosphonic acid; and a phenol delivertive such as bisphenol-A, xylenol, and naphthol. The organic acid salt can be salt which is soluble with respect to a solvent of the foregoing organic acid. Examples of the organic acid salt encompass sodium salt, potassium salt, and alkali metal salt.

The ingredient organic acid salt is used in the foregoing crystallizing reaction in the form of solution. In the solution, the organic acid salt becomes anionic, and reacts with the acid, thereby precipitating the crystals of the organic acid. These crystals are dissolved by reacting with the base.

If a purpose of the foregoing crystallization is purification, the organic acid salt may be such that an organic acid is dissolved in a base.

By having the organic acid salt contacting the acid or the base in the presence of water, the organic acid salt reacts with the acid or the base, thereby causing the crystallization or the dissolution.

The present embodiment deals with the case where, a) a reaction initial liquid is the solution of the organic acid salt, the solution prepared by dissolving the organic acid salt, for example, in water or an alkali (the solution is preferably the organic acid salt water solution), and b) the acid and/or the base is added to this reaction initial liquid. However, the present invention is not limited to this, and for example, it is possible to add water, along with the acid or the base, to the organic acid salt when the acid or the base is being added. Further, in the arrangement that the ingredient organic acid salt solution is prepared in advance, the addition of acid and/or the base may be carried out by adding a mixture of water and the acid and/or the base.

For example, the solvent for dissolving therein the organic acid salt is a water-base solvent such as water, an organic solvent capable of being mixed with water, or a mixture of the organic solvent and water. The solvent is not particularly limited as long as the solvent is capable of being evenly mixed with water. The solvent is most preferably water.

More specifically, examples of the organic solvent are; methanol, ethanol, isopropanol, acetone, tetrahydrofuran, dioxan, N-methyl-2-pyrrolidone, dimethylsulfoxide, dimethylformamide, etc. However, the organic solvent is not limited to these. It is possible to use one of the above listed organic solvents, or use a combination of two or more of the organic solvents as needed.

The base used is not limited as long as the base is capable of dissolving the organic acid. For example, the base may be sodium hydroxide, potassium hydroxide, ammonia gas, ammonia water, potassium carbonate, sodium carbonate, sodium bicarbonate, or the like. It is preferable that the base be sodium hydroxide, potassium hydroxide, potassium carbonate, sodium carbonate, or sodium bicarbonate. In the present invention, it is preferable that a cation part of the ingredient organic acid salt provided is identical to that of the base being used.

Further, the acid being used is not limited as long as the solubility of the targeted compound in the combination of the acid and the solvent used is small; i.e., as long as the acid allows the targeted compound to be crystallized out by causing the ingredient compound to be reacted with the acid. For example, the acid may be ammonium sulfate, carbon dioxide gas, hydrochloric acid gas, SOx, NOx, or the like. Amongst the acids, hydrochloric acid or sulfuric acid is suitable, because these acids are easy to handle.

The crystallizing method of the present embodiment is suitable for producing crystals at neutral or a pH below neutral.

As mentioned before, the crystallizing method of the present embodiment is especially effective for crystallizing a non water-soluble or a hardly water-soluble organic acid, and is suitable for producing crystals of such an organic acid.

In the crystallizing method of the present embodiment, a needed amount of the acid to be added is ultimately determined based on a) an amount of the organic acid crystals to be converted into the organic acid salt, the organic acid crystals having been precipitated, and b) timing for converting the crystals into the organic acid salt.

The following describes the first and second methods in detail, with reference to figures.

First described is the first method.

For example, a reaction vessel (crystallizing-reaction vessel) for use in the first method is a stirring vessel provided with a stirring device or the like. The stirring vessel may have a disc turbine blade, a paddle blade, a sweepback blade such as 3-sweepback blade, or an anchor blade, or the like. However, a size (capacity), shape, material and the like of the reaction vessel are not particularly limited as long as the reaction vessel can be used for the reactions of the ingredient organic acid salt with the acid and the base.

The reaction vessel is preferably provided on its external wall with a jacket which can heat or cool the reaction liquid via the reaction vessel, e.g., by a cooling medium or a heating medium passing through the jacket. With a provision of such a jacket to the reaction vessel, it is possible to easily control a reaction temperature. For example, a heat of neutralization can be easily removed.

It is preferable that a rotation number of the stirrer (stirring blade) be so set that an stirring power per unit volume in the reaction vessel is within a range of 0.05 to 2.0 kW/m$^3$, more preferably 0.1 to 0.4 kW/m$^3$.

Further, in addition to the stirring blade, the reaction vessel may have a baffle such as a baffle plate, beaver-tail baffle, a finger baffle, a disc baffle, a doughnut-shaped baffle, or the like.

FIG. 1 illustrates an example of a crystallizing apparatus suitable for use in the first method.

As illustrated in FIG. 1, a crystallizing apparatus 1 is provided with: a reaction vessel 2 serving as a crystallizing-reaction vessel for use in crystallization; an acid supplying line (acid supplying section) 3 for supplying an acid to the reaction vessel 2; and a base supplying line (base supplying section) 4 for supplying a base to the reaction vessel 2.

The reaction vessel 2 is provided with a stirrer 5 for causing a reaction by stirring a reaction initial liquid provided in the reaction vessel 2. Further, the reaction vessel 2 is provided, on its outside wall, with a jacket 6 having passage apertures (not shown) serving as an inlet or an outlet for the heating medium such as warm water.

The acid supplying line 3 is provided with: an acid tank 7 for storing therein the acid; hollow connecting tubes 8 and 9 serving as an acid supplying path (flow path); a dropping tube 10 for supplying, to the reaction vessel 2, the acid in a dropping manner; and an acid-supplying pump 11 for sending the acid stored in the acid tank 7 to the dropping tube 10 via the connecting tubes 8 and 9, the acid-supplying pump 11 being provided between the connecting tubes 8 and 9.

Further, the base supplying line 4 is provided with: a base tank 12 for storing therein the base; hollow connecting tubes 13 and 14 serving as a base supplying path (flow path); a dropping tube 15 for supplying, to the reaction vessel 2, the base in a dropping manner; and a base-supplying pump 16 for sending the base stored in the base tank 12 to the dropping tube 15 via the connecting tubes 13 and 14, the base-supplying pump 16 being provided between the connecting tubes 13 and 14.

Next described is an example of crystallizing operation by using the foregoing crystallizing apparatus 1.

First, the solution of the ingredient organic acid salt is prepared by dissolving the ingredient organic acid salt in water or an alkali. Next, the solution of the ingredient organic acid salt is supplied into the reaction vessel 2 as the reaction initial liquid. Next, by using the pump 11, the acid stored in the acid tank 7 is supplied to the reaction liquid in the reaction vessel 2, via the connecting tubes 8 and 9 and the dropping tube 10. For example, the acid stored in the acid tank 7 is diluted with water to a desirable concentration in advance. In the present embodiment, for example, hydrochloric acid water solution of 6N is used. However, the present invention is not limited to this.

As mentioned before, the organic acid salt in the reaction initial liquid reacts with the acid supplied to the reaction vessel 2. This causes the reaction initial liquid to have the supersaturation state (II). Then, after the rapid desupersaturation (III), the solution transits to the saturation state (IV), thereby crystallizing out the organic acid.

Next, at an arbitrary point during the (IV), the base stored in the base tank 12 is supplied by using the pump 16, to the reaction liquid in the reaction vessel 2 via the connecting tubes 13 and 14 and the dropping tube 15. This dissolves the minute crystals; i.e., a part of crystals being precipitated, in the reaction vessel 2.

Timing for supplying the base may be a) when the targeted organic acid is completely crystallized from the ingredient organic acid salt, or b) when the targeted organic acid is partially crystallized from the ingredient organic acid salt. However, in order to save the amount of the base and the acid used, it is preferable that the timing be the latter one. It is particularly preferable to supply the base to the reaction liquid when the crystals starts being precipitated.

The crystallization may be confirmed visually. Since a pH significantly changes when the crystals are precipitated, it is also possible to confirm the crystallization by using a pH meter for detecting a change in the pH of the reaction liquid. It is needless to say that, the crystallization does not necessarily have to be confirmed, and all of the reactions may be automatically carried out. In order to automatically carry out the reactions, the crystals are precipitated by using such an amount of the acid that the value obtained by dividing the amount of the added acid by the equivalent weight of the acid is 1 or more, where the number of anionic functional groups in the ingredient organic acid salt being provided is 1.

Next, by using the pump 11, the acid stored in the acid tank 7 is supplied again to the reaction liquid in the reaction vessel 2, via the connecting tubes 8 and 9 and the dropping tube 10. Thereby, the organic acid salt corresponding to the crystals being dissolved by the base is used again in the crystallization, thus causing the crystal growth. As a result, crystals whose mean particle diameter is large are obtained.

In the crystallization method of the present embodiment, a value (hereinafter referred to as base equivalent weight-derived value) obtained by dividing an amount (g) of the added base by an equivalent weight (g) of the base is less than the value (hereinafter referred to as acid equivalent weight-derived value) obtained by dividing the amount (g) of the added acid by the equivalent weight (g) of the acid. Further, in addition to an amount of the acid needed for acidifying all of the anionic functional groups contained in the organic acid salt, an amount of the acid to be neutralized by the base is used for the organic acid salt being provided. In other words, in the crystallizing method of the present embodiment, the amount of the acid and the amount of the base to be used are so determined that the acid equivalent weight-derived value of the added acid is larger than the sum of a) a value obtained by dividing an amount (g) of the initially supplied organic acid salt by an equivalent weight (g) of the organic acid salt, and b) the base equivalent weight-derived value of the base. The amount of the used base may be determined so that the amount of the acid excluding an amount of the acid being neutralized by the base is reduced to a level of the foregoing (II). That is, the amount of the base to be used may be determined so that, after the acid is added for causing the crystallization, $Q/(P \times Z)$ normally becomes 0.01 to 0.3, preferably 0.05 to 0.2, where:

Q is a value obtained by dividing, by an equivalent weight of the organic acid, an amount of the remaining organic acid crystals;

P is an amount (g) of the ingredient organic acid salt provided; and

Z is a value obtained by dividing the molecular mass of the provided ingredient organic acid salt by the number of the anionic functional groups in the single molecule of the organic acid salt. This prolongs a period of the crystal growth, and is more effective.

For example, in a case where the organic acid is adipic acid, the amount of used base may be such that the amount of crystals remaining after the addition of the base is normally within a range of 1 to 30 wt. % of the amount of the crystals precipitated if the provided ingredient organic acid salt is wholly reacted with the acid. In other words, the amount of the used base may be such that the amount of the remaining crystals is within a range of 1 to 30 wt. % of the organic acid salt provided. It is preferable that the amount of the used base be such that the amount of the remaining crystals is within a range of 5 to 20 wt. % of the amount of the crystals precipitated if the provided ingredient organic acid salt is wholly reacted with the acid.

More specifically, in the foregoing reaction, a value obtained by dividing the acid equivalent weight-derived value of the initially added acid by (P×Z) is normally 0.33 to 3, preferably 0.5 to 1.3. Further, a value obtained by dividing the base equivalent weight-derived value of the used base by the (P×Z) is in a range of values obtained by subtracting normally 0.03 to 0.3, preferably 0.05 to 0.15 from the value obtained by dividing the acid equivalent weight-derived value of the initially added acid by (P×Z). A value obtained by dividing the acid equivalent weight-derived value of the acid used after the addition of the base by (P×Z) is as described as the follows. Namely, a value obtained by subtracting (i) the value obtained by dividing the base equivalent weight-derived value of the used base by (P×Z) from (ii) the sum of a) the value obtained by dividing the acid equivalent weight-derived value of the initially added acid by (P×Z) and b) the value obtained by dividing the acid equivalent weight-derived value of the acid used after the addition of the base by (P×Z) is between 0.9 to 3, preferably 1 to 1.3.

Timing, a position, and a method for supplying the acid or the base are not particularly limited, and the acid or the base does not necessarily have to be supplied by using the acid supplying line 3 or the base supplying line 4 having the foregoing configuration. Further, the dropping tubes 10 and 15 do not necessarily have to be used for supplying the acid or the base. In the case of using the dropping tubes 10 and 15, the dropping tubes 10 and 15 may be provided at an arbitrary position of the reaction vessel 2.

Further, a material and a size of each member constituting the crystallizing apparatus 1 are not particularly limited as long as the reactions of the ingredient organic acid salt with the acid or the base can be carried out.

Further, an amount of the reaction initial liquid provided in the reaction vessel 2 is not particularly limited. For example, the amount may be suitably determined according to a concentration of a substance to be crystallized and/or amounts of the acid and the base used.

Further, conditions for the foregoing reactions, such as reaction time, reaction temperature, and reaction pressure, are not particularly limited. For example, the conditions may be suitably determined according to a) an amount of the ingredient organic acid salt, b) the kind of the ingredient organic acid salt, c) which kind of ingredient organic acid salt is used with which kind of acid, or d) which kind of ingredient organic acid salt is used with which kind of base.

In the crystallization, the amount of the reaction liquid increases, though gradually, by adding the acid or the base to the reaction initial liquid. This increase in the amount of the reaction liquid is preferably taken into account when determining the reaction vessel 2 used and the reaction conditions.

Next described is the second method.

In a case where the forward and backward reactions are simultaneously carried out in a single reaction vessel, the crystallizing apparatus 1 shown in FIG. 1 can be used for the second method.

As is the case with the reaction vessel 2 illustrated in FIG. 1 for use in the first method, a reaction vessel (crystallizing-reaction vessel) for use in the second method is a stirring vessel or the like provided with a stirrer having a disc turbine blade, a paddle blade, a sweepback blade such as a 3-sweepback blade, or an anchor blade, or the like. However, a size (capacity), shape, material and the like of the reaction vessel 2 are not particularly limited as long as the reaction vessel 2 can be used for the reactions of the organic acid salt with the acid and the base.

Further, in the second method as in the first method, the reaction vessel 2 is preferably provided on its external wall with a jacket in which a cooling medium or a heating medium is conducted, so that the reaction liquid can be cooled down or heated up via the reaction vessel. With a provision of such a jacket to the reaction vessel 2, it is possible to easily control a reaction temperature. For example, a heat of neutralization can be easily removed.

It is preferable that a rotation number of the stirrer (stirring blade) be so defined that a stirring power per unit volume in the reaction vessel is within a range of 0.05 to 2.0 kW/m$^3$, more preferably 0.05 to 0.3 kW/m$^3$.

Further, in addition to the stirring blade, the reaction vessel 2 may have a baffle such as a baffle plate, beaver-tail baffle, a finger baffle, a disc baffle, or a doughnut-shaped baffle. Particularly, if the second method is the foregoing (2) where the forward and backward reactions are simultaneously carried out in a single reaction vessel, the use of the baffle or the like for partially dividing the inside of the reaction vessel 2 restrains neutralization of the acid and the base, thereby avoiding wasting the acid and the base.

The dropping tubes 10 and 15 may be provided at an arbitrary position of the reaction vessel 2, as illustrated in FIG. 1. However, in this case where the base is added utilizing a heterogeneous state of the liquid in the reaction vessel 2, positions to which the acid and the base are supplied are preferably such that the acid and the base are hardly mixed in consideration of a flow pattern inside the reaction vessel 2, i.e., so that the acid and the base are hardly in contact with each other. This is for restraining the waste caused by the neutralization of the acid and the base. Accordingly the dropping tubes 10 and 15 are preferably provided so that they are located as far apart as possible from each other.

In the crystallizing apparatus 1 illustrated in FIG. 1, the dropping tube 10 for supplying the acid is provided in a lower portion of the reaction vessel 2, while the dropping tube 15 for supplying the base is provided above the reaction liquid in the reaction vessel 2; i.e., in an upper portion of the reaction vessel 2. With this arrangement, the acid is supplied to the lower portion of the reaction vessel 2, and the base is supplied to the upper portion of the reaction vessel 2. However, the arrangement of the dropping tubes 10 and 15 are not limited to this, as long as the dropping tubes are arranged apart from each other.

The minute crystals tends to move upward easily as a result of the stirring. Accordingly, it is preferable that the acid be supplied, by using the dropping tube 10, nearby the stirrer 5 (stirring blade) in the reaction vessel 2, and that the base be supplied, by using the dropping tube 15, to the surface of liquid to be stirred; i.e., the reaction liquid (See FIG. 1). In other words, for reducing the amount of the minute crystals, and producing crystals whose mean particle diameter is large, the crystallizing apparatus 1 is preferable such that the dropping tube 10 for supplying the acid be provided in the lower portion of the reaction vessel 2, and that the dropping tube 15 for supplying the base be provided in the upper portion of the reaction vessel 2.

Next described is an example of the crystallization operation by using the foregoing crystallizing apparatus 1 in the second method.

First, the solution of the ingredient organic acid salt is prepared by dissolving the ingredient organic acid salt in water or an alkali. Next, the solution of the ingredient organic acid salt is provided in the reaction vessel 2 as a reaction initial liquid. The steps up to here are the same as the first method, however, in the case of using the method (2), the acid stored in the acid tank 7 is supplied, by using the pump 11, to the reaction liquid in the reaction vessel 7 via the connecting tubes 8 and 9 and the dropping tube 10, while the base stored in the base tank 12 is supplied, by using the pump 16, to the reaction liquid in the reaction vessel 2 via the connecting tubes 13 and 14 and the dropping tube 15.

In this case, in order to efficiently carry out the forward reaction and the backward reaction, it is preferable to start supplying the base after a) the supplying of the acid is started, and b) the crystals are started being precipitated.

In the reaction liquid, the forward reaction dominantly takes place nearby a region where the acid is being supplied, and the backward reaction dominantly takes place nearby a region where the base is being supplied. The crystals are precipitated nearby the region where the acid is being supplied. The stirring causes the minute crystals amongst these crystals to be dissolved nearby the region where the base is being supplied. The remaining crystals grow nearby the position where the acid is being dropped. These reactions are repeated in the reaction vessel 2, and the remaining crystals gradually grow to larger crystals.

In the foregoing crystallizing method as well, an amount of the acid and the base being used is so determined that the acid equivalent weight-derived value of the acid supplied becomes larger than the sum of a) the value obtained by dividing the amount of the supplied ingredient organic acid salt by the equivalent weight of the organic acid salt, and b) the base equivalent weight-derived value of the supplied base.

The value obtained by dividing the base equivalent weight-derived value of the used base by the (P×Z) is normally 0.5 to 10, preferably 0.8 to 2.5.

Further, the value obtained by dividing the acid equivalent weight-derived value of the used acid by (P×Z) is within a range of values obtained by adding normally 0.9 to 1.5, and preferably 1.0 to 1.3, from the value obtained by dividing the base equivalent weight-derived value of the used base by the (P×Z).

The base may be supplied at a constant speed. However, it is preferable that the base be supplied in an intermissive manner. This is because, supplying of the base in an intermissive manner enhances the heterogeneous state of the reaction liquid in the reaction vessel 2, whereby the mean particle diameter of the crystals tends to increase.

In the crystallizing method, the mean particle diameter of the crystals tends to increase if the base equivalent weight-derived value of the base is relatively larger than the acid equivalent weight-derived value of the acid supplied. Therefore, it is preferable that the base equivalent weight-derived value of the base be relatively larger than the acid equivalent weight-derived value of the acid supplied. Further, the mean particle diameter tends to increase if the concentration of the base is high. Therefore, the concentration of the base is preferably high.

How much amount of the base, duration of the dropping of the base, and the like are necessary is varied depending on a mixing condition attributed to a flow pattern of the crystallizing apparatus 1; i.e., the flow pattern in the reaction vessel 2 in this case. Therefore, it is preferable that these conditions be changed to be optimized. That is, it is preferable that balances among stirring conditions, dropping position, dropping speed, and dropping amount be optimized so as to cause the liquid in the reaction vessel 2 to be appropriately stagnant.

Further, as described, instead of directly adding the base in the crystallizing-reaction vessel, it is possible to a) add the base after transfer the reaction liquid to another reaction vessel from the crystallizing-reaction vessel, and then b) transfer the reaction liquid back to the crystallizing-reaction vessel, thereby carrying out the series of the reactions.

As an example of this method for carrying out the series of reactions by transferring the reaction liquid from the crystallizing-reaction vessel to the another vessel in which the base is added therein and transferring it back from the another vessel to the crystallizing-reaction vessel, the foregoing method (3) is described in detail below with reference to FIG. 2. In the method (3), the forward reaction and the backward reaction are carried out in different reaction vessels. By circulating liquid in these reaction vessels between the reaction vessels, the forward reaction and the backward reactions are alternately carried out.

Figure 2:
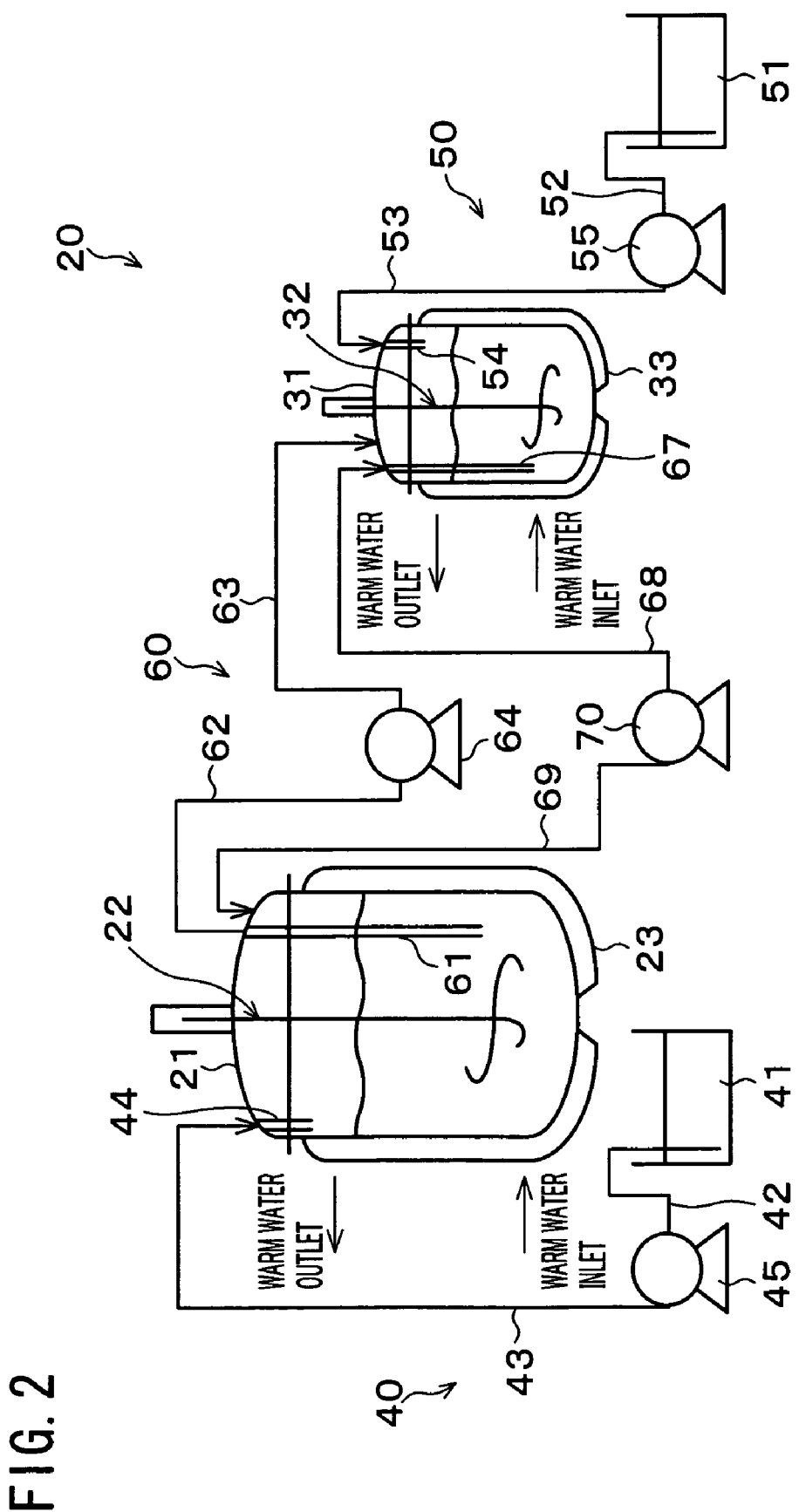
FIG. 2 is a schematic view illustrating a configuration of another crystallizing apparatus for use in the crystallizing method of the present invention.

FIG. 2 illustrates an example of a crystallizing apparatus suitable for the foregoing method.

As illustrated in FIG. 2, a crystallizing apparatus 20 is provided with: a) a first reaction vessel 21 serving as a crystallizing-reaction vessel for use in a crystallization of an ingredient organic acid salt using an acid; b) a second reaction vessel 31 serving as a reaction vessel for use in the backward reaction in which crystals precipitated in the crystallization in the first reaction vessel 21 are partially dissolved by a base; c) an acid supplying line (acid supplying section) 40 for supplying the acid to the first reaction vessel 21; d) a base supplying line (base supplying section) 50 for supplying the base to the second reaction vessel 31; and e) a reaction liquid circulating line (reaction liquid circulating section) 60 for circulating a reaction liquid between the first reaction vessel 21 and the second reaction vessel 31.

The first reaction vessel 21 is provided with a stirrer 22 for causing a reaction by stirring a reaction initial liquid provided in the first reaction vessel 21. Further, the first reaction vessel 21 is provided, on its outside wall, with a jacket 23 having a conduction aperture (not shown) serving as an inlet or an outlet for the heating medium such as warm water.

Similarly, the second reaction vessel 31 is provided with a stirrer 32 for causing a reaction by stirring a reaction initial liquid provided in the second reaction vessel 31. Further, the second reaction vessel 31 is provided, on its outside wall, with a jacket 33 having a conduction aperture (not shown) serving as an inlet or an outlet for the heating medium such as warm water.

The acid supplying line 40 is provided with: an acid tank 41 for storing therein the acid; hollow connecting tubes 42 and 43 serving as an acid supplying path (flow path); a dropping tube 44 for supplying, to the first reaction vessel 21, the acid in a dropping manner; and an acid-supplying pump 45 for sending the acid stored in the acid tank 41 to the dropping tube 44 via the connecting tubes 42 and 43, the acid-supplying pump 45 being provided between the connecting tubes 42 and 43.

Further, the base supplying line 50 is provided with: a base tank 51 for storing therein the base; hollow connecting tubes 52 and 53 serving as a base supplying path (flow path); a dropping tube 54 for supplying, in the second reaction vessel 31, the base in a dropping manner; and a base-supplying pump 55 for sending the acid stored in the acid tank 51 to the dropping tube 54 via the connecting tubes 52 and 53, the base-supplying pump 55 being provided between the connecting tubes 52 and 53.

The arrangement of this method here is are as described above, in terms of a) configurations of the first and the second reaction vessels 21 and 31, the acid supplying line 40 and the base supplying line 50, and b) crystallization conditions such as rotation numbers of reacting stirrings, in each of the first and the second reaction vessels 21 and 31. Accordingly, the arrangement of this method here can be set as in the arrangement using the crystallizing apparatus 1. That is, the crystallization conditions in the crystallizing apparatus 20 can be the same as those in the second method carried out by using the crystallizing apparatus 1 except in that: a) the forward reaction and the backward reaction are respectively carried out in the separate reaction vessels, and b) the reaction liquid is circulated between the first reaction vessel 21 and the second reaction vessel 31 by using the reaction liquid circulating line 60.

The reaction liquid circulating line 60 has a delivering path and a returning path each connecting the first reaction vessel 21 with the second reaction vessel 31. The delivering path is for delivering the reaction liquid in the first reaction vessel 21 to the second reaction vessel 31, and the returning path is for delivering the reaction liquid in the second reaction vessel 31 to the first reaction vessel 21.

The delivering path of the reaction liquid circulating line 60 is provided with: a suction tube 61 for sucking in the reaction liquid in the first reaction vessel 21; hollow connecting tubes 62 and 63, the connecting tubes 62 and 63 serving as a flow path of the reaction liquid; and a reaction liquid circulating pump 64 for delivering the reaction liquid in the first reaction vessel 21 to the second reaction vessel 31 via the connecting tubes 62 and 63, the reaction liquid circulating pump 64 being provided between the connecting tubes 62 and 63.

Further, the returning path of the reaction liquid circulating line 60 is provided with: a suction tube 67 for sucking in the reaction liquid in the second reaction vessel 31; hollow connecting tubes 68 and 69, the connecting tubes 68 and 69 serving as a flow path of the reaction liquid; and a reaction liquid circulating pump 70 for delivering the reaction liquid in the second reaction vessel 31 to the first reaction vessel 21 via the connecting tubes 68 and 69, the reaction liquid circulating pump 70 being provided between the connecting tubes 68 and 69.

Thus, the reaction liquids in the crystallizing apparatus 21 and 31 are respectively sucked into the pump 64 and 70, via connecting tube 62 and 68, by using the suction tube 61 and 67. Then, the reaction liquids are respectively supplied to the reaction vessels 21 and 31 via the connecting tubes 63 and 69, thereby circulating the reaction liquid between the reaction vessels 21 and 31.

The reaction vessels 21 and 31 may be an stirring mixing vessel, a line mixer, a static mixer, or the like. Further, the reaction vessels 21 and 31 may be the same as the reaction vessel used as the reaction vessel 2. However, the reaction vessels 21 and 31 are not particularly limited to these, as long as the reaction vessels can be used for the reactions of the ingredient organic acid salt with the acid and the base. Further, sizes (capacities), shapes, materials and the like of the reaction vessels are not particularly limited neither.

Next, the following describes an example of a crystallizing operation by using the crystallizing apparatus 20.

First, the solution of the ingredient organic acid salt is prepared by dissolving the ingredient organic acid salt in water or an alkali. Next, the solution of the ingredient organic acid salt is provided in the first reaction vessel 21 as a reaction initial liquid. Next, by using the pump 45, the acid stored in the acid tank 41 is supplied to the reaction liquid in the reaction vessel 21, via the connecting tubes 42 and 43 and the dropping tube 44. For example, the acid stored in the acid tank 41 is diluted with water to a desirable concentration in advance.

The ingredient organic acid salt in the first reaction vessel 21 reacts with the acid supplied into the first reaction vessel 21, whereby crystals of the ingredient organic acid are precipitated. The reaction liquid in which the crystals being dispersed therein is sucked out from the first reaction vessel 21 via the suction tube 61, by using the pump 64 provided on the delivering path of the reaction liquid circulating line 60. Then, the reaction liquid is supplied in the second reaction vessel 31 via the connecting tubes 62 and 63.

In the second reaction vessel 31, the base stored in the base tank 51 is supplied by using the pump 55, via the connecting tubes 52 and 53 and the dropping tube 54. The crystals in the reaction liquid supplied in the second reaction vessel 31 are partially dissolved by reacting with the base supplied in the second reaction vessel 31. Thus, only relatively large crystals remain in the reaction liquid. As mentioned before, for example, the base stored in the base tank 51 is previously diluted with water to a desirable concentration in advance.

The reaction liquid in which the minute crystals are partially dissolved is sucked out from the second reaction vessel 31 via the suction tube 67, by using the pump 70 provided on the returning path of the reaction liquid circulating line 60. Then, the reaction liquid is returned to the first reaction vessel 21 via the connecting tubes 68 and 69.

In the first reaction vessel 21, the crystal growth occurs using the crystals in the reaction liquid as cores (seed crystals), the crystals being returned from the second reaction vessel 31, while new crystals are produced by the acid being supplied from the acid tank 41 via the dropping tube 44.

The reaction liquid in the first reaction vessel 21 is supplied again in the second reaction vessel 31 via the delivering path of the reaction liquid circulating line 60, and minute crystals newly produced in the reaction vessel 21 are dissolved. The reaction liquid is then returned again to the first reaction vessel 21. By repeating this process, crystals having a larger mean particle diameter are produced.

In a case employing the crystallizing apparatus 20, the base is supplied to the second reaction vessel 31. With this base, the minute crystals in the reaction liquid supplied to the second reaction vessel 31 by the delivering path of the reaction liquid circulating line 60 are dissolved. It is possible to observe the relatively large crystals being returned to the first reaction vessel 21 through the returning path of the reaction liquid circulating line 60.

With the crystallizing apparatus 20, it is possible to control the circulation of the reaction liquid using the pumps 64 and/or 70. For example, it is possible to control an amount of the reaction liquid to be circulated, and the timing for delivering the reaction liquid. Thus, by using the crystallizing apparatus 20, for example, it is possible to adjust reaction time in each of the reaction vessels; i.e., in the first reaction vessel 21 and the second reaction vessel 31. Needless to say, in the crystallizing apparatus 20, the crystallization can be carried out by constantly circulating the reaction liquid.

The crystallizing conditions for the case of using the crystallizing apparatus 20 are determined as in the case of using the crystallizing apparatus 1 in the second method.

For example, it is preferable that a rotation number of the stirrer 22 (stirring blade) be so defined that an stirring power per unit volume in the first reaction vessel 21 is within a range of 0.05 to 2.0 kW/m$^3$, more preferably 0.05 to 0.3 kW/m$^3$.

However, in the case of using the crystallizing apparatus 20, the rotation number for the stirring in the base-supplying side is not limited as long as the rotation number is sufficient for dissolving the crystals. For example, it is preferable that the rotation number of the stirrer 32 (stirring blade) be so defined that a stirring power per unit volume in the second reaction vessel 31 is within a range of 0.1 to 2.0 kW/m³.

In other words, it is preferable that the stirrer 22 slowly stirs the liquid so that the crystals are not broken up by the stirring. On the other hand, it is preferable that the stirring by the stirrer 32 be relatively intensive, so that the crystals are dissolved faster. However, the rotation number of the stirrer 32 is not particularly limited.

In the foregoing crystallizing method as well, the amount of the acid and the base being used is so determined that the acid equivalent weight-derived value of the supplied acid is larger than the sum of a) the value obtained by dividing the amount of the initially-supplied ingredient organic acid salt by the equivalent weight of the organic acid salt, and b) the base equivalent weight-derived value of the used base.

The value obtained by dividing the base equivalent weight-derived value of the used base by the (P×Z) is normally 0.1 to 2.5, preferably 0.75 to 1.5.

Further, the value obtained by dividing the acid equivalent weight-derived value of the used acid by (P×Z) is within a range of values obtained by adding normally 0.9 to 1.5, preferably 1.0 to 1.2, to the value obtained by dividing the base equivalent weight-derived value of the used base by the (P×Z).

However, in the foregoing method, an amount of the used base is preferably such that the reaction vessel 31 stays alkali for a longer period. This amount of the used base is determined so that a value (α) resulted from the (L×M)/(T×F×P×Z) is 0.5 or more and less than 1.5, preferably 0.7 or more and less than 1.1, where:

P is an amount (g) of the ingredient organic acid salt provided;

Z is a value obtained by dividing a molecular weight of the provided ingredient organic acid salt by the number of the anionic functional groups in the single molecule of the organic acid salt;

M is the base equivalent weight-derived value (the value obtained by dividing the added amount (g) of the base by the equivalent weight (g) of the base);

T(min) is a dropping period;

F is an amount (ml/min) of the reaction liquid circulated per unit period; and

L is a logarithmic means (ml) of a maximum amount and a minimum amount of the liquid in the reaction vessel; i.e., in the crystallizing apparatus 20 (i.e., the logarithmic means of the maximum and the minimum amount of a total of the liquid in the first reaction vessel 21, the second reaction vessel 31, and the connecting tubes 62, 63, 68, and 69).

In the crystallizing apparatus 20 illustrated in FIG. 2, the reaction liquid is sucked out from the first reaction vessel 21 and the second reaction vessel 31 by using the suction tubes 61 and 67. However, the present invention is not limited to this. For example, it is possible to provide a reaction liquid outlet aperture at the bottom or on the peripheral wall of the first reaction vessel 21 and/or the second reaction vessel 31, and draw the reaction liquid through the reaction liquid outlet aperture. In other words, as in the case of the dropping tubes 44 and 45, the connecting tubes 62, 63, 68, and 69, and the suction tubes 61 and 67, each of which constituting the reaction liquid circulating line 60, may be respectively connected with arbitrary positions of the reaction vessels 21 and 31.

Further, in the crystallizing apparatus 20 illustrated in FIG. 2, the reaction liquid drawn from the first reaction vessel 21 is supplied from the upper portion of the second reaction vessel 31 via the delivering path of the reaction liquid circulation line 60. Further, the reaction liquid drawn from the second reaction vessel 31 is supplied from the upper portion of the first reaction vessel 21 via the returning path of the reaction liquid circulation line 60. However, the configuration of the crystallizing apparatus 20 is not limited to this. Further, it is possible to provide a plurality of the first reaction vessels, the second reaction vessels, the acid supplying lines, the base supplying lines, reaction liquid circulation lines, or the like.

Further, in the second method as well, the conditions for the reactions, such as an amount of the reaction liquid initially supplied in the first reaction vessel 31, the reaction time, the reaction temperature, and the reaction pressure, are not particularly limited. For example, the conditions may be suitably determined according to a) an amount of the ingredient organic acid salt, b) the kind of the ingredient organic acid salt, c) which kind of ingredient organic acid salt is used with which kind of acid, or d) which kind of ingredient organic acid salt is used with which kind of base.

From this liquid thus obtained, the organic acid crystals are easily isolated by carrying out a conventional filtration. The filtration method may be a centrifugal filtration, a pressure filtration, a reduced pressure filtration, or a natural filtration, or any other filtration method.

As described, by carrying out the crystallizing methods of the present embodiment, it is possible to a) reduce the amount of the minute crystals, and b) increase the amount of the organic acid for use in the crystal growth, thus causing an efficient growth of the crystals. As a result, it is possible to stably obtain, with highly constant property, the crystals whose mean particle diameter is large; i.e., powder having a large bulk density.

The mean particle diameter of the crystals obtained by carrying out the foregoing crystallizing methods are expected to become larger. Thus, when filtering out the crystals contained in the reaction liquid, it becomes faster to filter the reaction liquid. Further, the obtained powder of the targeted organic acid has a larger bulk density, and a better flowability.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The present invention is described in further detail with reference to the following examples and comparative examples. However, the present invention is not limited to these.

EXAMPLE 1

12.02 g of salicylic acid, 15.17 g of a sodium hydroxide water solution of 8 mol/l (20° C.), and 499.87 g of water were added to a 1000 ml separable flask (reaction vessel) having 3-sweepback blade (stirrer) of 30 mm in radius. Then, solution in which the salicylic acid was completely dissolved was used as a solution (reaction initial liquid) of an ingredient organic acid salt.

Next, a stirring-rotation number of the 3-sweepback blade was set at 370 rpm. Then, at an internal temperature of 30° C., 19.14 g of hydrochloric acid of 6 mol/l (20° C.) was dropped taking 29 minutes, on a surface of the liquid in the separable flask by using a metering pump. A rapid crystallization was visually observed at 7 minutes after the start of dropping hydrochloric acid.

Next, on the surface of the liquid in the separable flask, 11.02 g of the sodium hydroxide water solution of 8 mol/l (20° C.) was supplied taking 8 minutes. Then, on a surface of the liquid in the separable flask, 12.75 g of hydrochloric acid of 6 mol/l (20° C.) was dropped taking 20 minutes, by using a metering pump.

After the reaction liquid in the separable flask was filtered by reduced pressure filtration, crystals thus obtained were dried under reduced pressure. Thereby, 10.35 g of salicylic acid crystals were obtained. Then, a volume mean diameter of the crystals is measured by using a laser-diffracting type particle size distribution measuring machine (Master Sizer S Long bed (registered trademark) manufactured by Malvarn Instruments Ltd.). The volume mean diameter of the crystals were 75.8 μm.

COMPARATIVE EXAMPLE 1

12.02 g of salicylic acid, 15.18 g of a sodium hydroxide water solution of 8 mol/l (20° C.), and 500.01 g of water were added to a 1000 ml separable flask (reaction vessel) having 3-sweepback blade (stirrer) of 30 mm in radius. Then, a solution in which the salicylic acid was completely dissolved was used as a solution (reaction initial liquid) of an ingredient organic acid salt.

Next, a stirring-rotation number of the 3-sweepback blade was set at 370 rpm. Then, at an internal temperature of 30° C., 19.15 g of hydrochloric acid of 6 mol/l (20° C.) was dropped taking 30 minutes, on a surface of the liquid in the separable flask by using a metering pump. A rapid crystallization was visually observed at 10 minutes after the start of dropping hydrochloric acid.

After the reaction liquid in the separable flask was filtered by reduced pressure filtration, crystals thus obtained were dried under reduced pressure. Thereby, 9.97 g of salicylic acid crystals were obtained. Then, a volume mean diameter of the crystals was measured by using the laser-diffracting type particle size distribution measuring machine used in the example 1. The volume mean diameter of the crystals were 53.3 μm.

EXAMPLE 2

14.62 g of adipic acid, 17.53 g of a sodium hydroxide water solution of 8 mol/l (20° C.), and 199.0 g of water were added to a 500 ml separable flask (reaction vessel) having 3-sweepback blade (stirrer) of 23 mm in radius. Then, a solution in which the adipic acid was completely dissolved was used as a solution (reaction initial liquid) of an ingredient organic acid salt.

Next, a stirring-rotation number of the 3-sweepback blade was set at 171 rpm. Then, at an internal temperature of 30° C., 40.26 g of hydrochloric acid of 6 mol/l (20° C.) was dropped taking 40 minutes, on a surface of the liquid in the separable flask by using a dropping funnel (dropping tube).

After 16 minutes had elapsed since the start of dropping hydrochloric acid, 15.95 g of the sodium hydroxide water solution of 8 mol/l (20° C.) was dropped on the surface of the reaction liquid in the separable flask by using a dropping funnel, while the acid is being dropped. The dropping of the sodium hydroxide water solution ended after 24 minutes.

Then, the dropping funnels used in the reactions; i.e. the dropping funnel for dropping hydrochloric acid and the funnel for dropping the sodium hydroxide, were respectively washed with 3.19 g and 2.08 g of water.

After the reaction liquid in the separable flask was filtered by reduced pressure filtration, crystals thus obtained were dried under reduced pressure. Thereby, adipic acid crystals were obtained. Then, a volume mean diameter of the crystals was measured by using the laser-diffracting type particle size distribution measuring machine used in the example 1. The volume mean diameter of the crystals were 175 μm. When 1.50 g of the adipic acid crystals obtained were put in a glass tube whose inside diameter is 8 mm, the height of the powder was 90 mm, and the bulk density of the powder was 332 kg/m$^3$.

COMPARATIVE EXAMPLE 2

14.62 g of adipic acid, 17.53 g of a sodium hydroxide water solution of 8 mol/l (20° C.), and 199.04 g of water were added to a 500 ml separable flask (reaction vessel) having 3-sweepback blade (stirrer) of 23 mm in radius. Then, a solution in which the adipic acid was completely dissolved was used as a solution (reaction initial liquid) of an ingredient organic acid salt.

Next, a stirring-rotation number of the 3-sweepback blade was set at 316 rpm. Then, at an internal temperature of 30° C., 21.96 g of hydrochloric acid of 6 mol/l (20° C.) was dropped taking 26 minutes, on a surface of the liquid in the separable flask by using a dropping funnel. Then, the dropping funnel was washed with 4.12 g of water.

After the reaction liquid in the separable flask was filtered by reduced pressure filtration, crystals thus obtained were dried under reduced pressure. Thereby, adipic acid crystals were obtained. Then, a volume mean diameter of the crystals was measured by using the laser-diffracting type particle size distribution measuring machine used in the example 1. The volume mean diameter of the crystals were 129 μm.

When 1.50 g of the adipic acid crystals obtained were put in a glass tube whose inside diameter is 8 mm, the height of the powder was 112 mm, and the bulk density of the powder was 267 kg/m$^3$.

EXAMPLE 3

50.13 g of biotin, 35.88 g of a sodium hydroxide water solution of 8 mol/l (20° C.), and 600.1 g of water were added to a 1000 ml separable flask (first reaction vessel) having 3-sweepback blade (stirrer) of 30 mm in radius. Then, a solution in which biotin was completely dissolved was used as a solution (reaction initial liquid) of an ingredient organic acid salt. Further, a stirring-rotation number of the 3-sweepback blade was set at 300 rpm. Further, 100.22 g of water was added to a 500 ml separable flask (second reaction vessel) having 3-sweepback blade (stirrer) of 23 mm in radius, and a stirring-rotation number of the 3-sweepback blade was set at 350 rpm. A dip-tube was provided on the first reaction vessel, and the content (reaction liquid) in the first reaction vessel was delivered to the surface of the content in the second reaction vessel at 32.8 ml/min. In a meanwhile, a dip-tube was provided on the second reaction vessel, and the content (reaction liquid) in the second reaction vessel was delivered to the surface of the content in the first reaction vessel at 32.8 ml/min. The contents of the first and the second reaction vessels were circulated for 10 min.

The circulation was continued at the foregoing fluid delivery rate. In a meanwhile, at an internal temperature of 30° C., 101.25 g of hydrochloric acid of 6 mol/l (20° C.) was dropped taking 45 minutes, on a surface of the liquid in the first reaction vessel by using a metering pump. At the same time, while the circulation was continued at the foregoing fluid delivery rate, at an internal temperature of 30° C., 48.96 g of the sodium hydroxide water solution of 8 mol/l (20° C.) was dropped taking 45 minutes, on a surface of the liquid in the second reaction vessel by using a metering pump.

After the droppings of the both substances were finished, the contents of the first and the second reaction vessels were circulated for 10 minutes at the foregoing fluid delivery rates. Then, the contents of the first and the second reaction vessels were filtered by reduced pressure filtration, and crystals thus obtained were dried under reduced pressure. Thereby, 49.83 g of biotin crystals were obtained. Then, a volume mean diameter of the crystals was measured by using a laser-diffracting type particle size distribution measuring machine used in the example 1. The volume mean diameter of the crystals were 24.1 μm. A loose bulk density and a packed bulk density of the crystals were measured by using a powder physical property measuring machine (Powder Tester (registered trademark) manufactured by Hosokawa Micron Group). The loose bulk density was 219 kg/m$^3$, and the packed bulk density was 402 kg/m$^3$.

COMPARATIVE EXAMPLE 3

50.02 g of biotin, 35.87 g of a sodium hydroxide water solution of 8 mol/l (20° C.), and 700.1 g of water were added to a 1000 ml separable flask (first reaction vessel) having 3-sweepback blade (stirrer) of 30 mm in radius. Then, a solution in which biotin was completely dissolved was used as a solution (reaction initial liquid) of an ingredient organic acid salt. Further, a stirring-rotation number of the 3-sweepback blade was set at 300 rpm. Next, at an internal temperature of 30° C., 44.93 g of hydrochloric acid of 6 mol/l (20° C.) was dropped taking 40 minutes, on a surface of the liquid in the separable flask by using a metering pump.

After the reaction liquid in the separable flask was filtered by reduced pressure filtration, and then crystals thus obtained were dried under reduced pressure. Thus, 49.96 g of the biotin crystals were obtained. Then, a volume mean diameter of the crystals was measured by using the laser-diffracting type particle size distribution measuring machine used in the example 3. The volume mean diameter of the crystals were 14.6 μm. A loose bulk density and a packed bulk density of the crystals were measured by using a powder physical property measuring machine (Powder Tester (registered trademark) manufactured by Hosokawa Micron Group). The loose bulk density was 188 kg/m$^3$, and the packed bulk density was 348 kg/m$^3$.

EXAMPLE 4

20.13 g of nicotinic acid, 28.50 g of a sodium hydroxide water solution of 8 mol/l (20° C.), and 300.73 g of water were added to a 500 ml separable flask (reaction vessel) having 3-sweepback blade (stirrer) of 23 mm in radius. Then, a solution in which nicotinic acid was completely dissolved was used as a solution (reaction initial liquid) of an ingredient organic acid salt. Next, a stirring-rotation number of the 3-sweepback blade was set at 300 rpm. Then, at an internal temperature of 5° C., 36.38 g of hydrochloric acid of 6 mol/l (20° C.) was dropped taking 3 minutes, on a surface of the liquid in the separable flask by using a dropping funnel. A rapid crystallization was observed 1 min. 10 sec. after the start of dropping hydrochloric acid.

Next, on the surface of the liquid in the separable flask, 20.71 g of the sodium hydroxide water solution of 8 mol/l (20° C.) was supplied. Then, on a surface of the liquid in the separable flask, 24.02 g of hydrochloric acid of 6 mol/l (20° C.) was dropped taking 2 minutes, by using a dropping funnel.

After the reaction liquid in the separable flask was filtered by reduced pressure filtration, crystals thus obtained were dried under reduced pressure. Thus, 13.28 g of the nicotinic acid crystals were obtained. Then, a volume mean diameter of the crystals was measured by using the laser-diffracting type particle size distribution measuring machine used in the example 1. The volume mean diameter of the crystals were 20.4 μm.

COMPARATIVE EXAMPLE 4

20.02 g of nicotinic acid, 28.49 g of a sodium hydroxide water solution of 8 mol/l (20° C.), and 300.31 g of water were added to a 500 ml separable flask (reaction vessel) having 3-sweepback blade (stirrer) of 23 mm in radius. Then, a solution in which nicotinic acid was completely dissolved was used as a solution (reaction initial liquid) of an ingredient organic acid salt.

Next, a stirring-rotation number of the 3-sweepback blade was set at 300 rpm. Then, at an internal temperature of 5° C., 36.16 g of hydrochloric acid of 6 mol/l (20° C.) was dropped taking 3 minutes, on a surface of the liquid in the separable flask by using a dropping funnel. A rapid crystallization was observed at 1 min and 10 sec after the start of dropping hydrochloric acid.

After the reaction liquid in the separable flask was filtered by reduced pressure filtration, crystals thus obtained were dried under reduced pressure. Thus, 14.10 g of the nicotinic acid crystals were obtained. Then, a volume mean diameter of the crystals was measured by using the laser-diffracting type particle size distribution measuring machine used in the example 1. The volume mean diameter of the crystals were 18.4 μm.

INDUSTRIAL APPLICABILITY

The present invention relates to a method for crystallizing an organic acid, including a production of crystals having a large mean particle diameter and a large bulk density, by adding an acid to a solution of an organic acid salt. The present invention also relates to a crystallizing apparatus suitable for use in such a method. As mentioned before, the present invention has various advantages. For example, a filtration work becomes easy. Accordingly, the present invention is applicable to not only the production of the organic acid, but also various chemical industries using an organic acid as a raw material. For example, the present invention is also applicable to pharmaceutical manufacturing industry, agrochemical manufacturing industry, food manufacturing industry, various chemical industries such as industrial chemical manufacturing industry of additives etc.

The invention claimed is:

1. A method for crystallizing an organic acid comprising the steps of:
    converting a part of organic acid crystals into an organic acid salt and dissolving the organic acid salt by adding a base to a liquid containing organic acid crystals, the liquid being obtained by adding an acid to a solution of an organic acid salt; and
    adding an acid to the organic acid salt dissolved liquid.

2. A method for crystallizing an organic acid comprising the steps of:
    precipitating at least a part of total of the organic acid crystals that are precipitable, by adding an acid to a solution of an organic acid salt, so as to obtain a liquid containing the precipitated organic acid crystals;
    converting a part of the precipitated organic acid crystals into an organic acid salt and dissolving the organic acid salt, by adding a base to the liquid containing the precipitated organic acid crystals; and
    adding an acid to the organic acid salt dissolved liquid.

3. The method as set forth in claim 1, wherein M defined below satisfies the following formula:

$$Q/(P \times Z) - 0.3 \leq M/(P \times Z) \leq Q/(P \times Z) - 0.03,$$

where:
M is a value obtained by dividing, by an equivalent weight (g) of the base, an amount (g) of the base being added;
Q is a value obtained by dividing, by an equivalent weight (g) of the acid, an amount (g) of the acid being added before the base is added;

P is an amount(g) of the organic acid salt in the solution containing the organic acid salt before the initial addition of the acid; and Z is a value obtained by dividing a molecular weight of the organic acid salt in the solution of the organic acid salt before the initial addition of the acid, by the number of anionic functional groups included in one molecule of the organic acid salt.

4. The method as set forth in claim 2, wherein M defined below satisfies the following formula:

$$Q/(P \times Z) - 0.3 \leq M/(P \times Z) \leq Q/(P \times Z) - 0.03,$$

where:

M is a value obtained by dividing, by an equivalent weight (g) of the base, an amount (g) of the base being added;

Q is a value obtained by dividing, by an equivalent weight (g) of the acid, an amount (g) of the acid being added before the base is added;

P is an amount(g) of the organic acid salt in the solution containing the organic acid salt before the initial addition of the acid; and Z is a value obtained by dividing a molecular weight of the organic acid salt in the solution of the organic acid salt before the initial addition of the acid, by the number of anionic functional groups included in one molecule of the organic acid salt.

5. The method as set forth in claim 1, wherein an amount of the organic acid crystals remained after the addition of the base is from 1 to 30 wt. % of the total of the organic acid crystals to be crystallized.

6. The method as set forth in claim 2, wherein an amount of the organic acid crystals remained after the addition of the base is from 1 to 30 wt. % of the total of the organic acid crystals to be crystallized.

7. A method for crystallizing an organic acid by adding an acid to a solution of an organic acid salt, wherein:

after organic acid crystals start being precipitated by the addition of the acid, so that a liquid containing the precipitated organic acid crystals is obtained, the addition of the acid is carried out while a part of the precipitated organic acid crystals is being converted into the organic acid salt and the organic acid salt is being dissolved, by addition of a base to a liquid containing the precipitated organic acid crystals.

8. The method as set forth in claim 7, wherein:

M/(P×Z) defined below satisfies the following formula:

$$Q/(P \times Z) - 0.3 \leq M/(P \times Z) \leq Q/(P \times Z) - 0.03,$$

where:

M is a value obtained by dividing, by an equivalent weight (g) of the base, an amount (g) of the base being added;

Q is a value obtained by dividing, by an equivalent weight (g) of the acid, an amount (g) of the acid being added before the base is added;

P is an amount(g) of the organic acid salt in the solution of the organic acid salt before the initial addition of the acid; and Z is a value obtained by dividing a molecular weight of the organic acid salt in the solution of the organic acid salt before the initial addition of the acid, by the number of anionic functional groups included in one molecule of the organic acid salt.

9. The method as set forth in claim 7, wherein:

the acid and the base are respectively added in reaction vessels being connected with each other, while liquid in the reaction vessels is circulated between the reaction vessels; and an amount of the base is so adjusted that a value resulting from a formula L×M/(T×F×P×Z) is 0.5 or more and less than 1.5:

where:

P is an amount(g) of the organic acid salt in the solution of the organic acid salt before the initial addition of the acid;

Z is a value obtained by dividing a molecular weight of the organic acid salt, by the number of anionic functional groups included in one molecule of the organic acid salt;

M is a value obtained by dividing, by an equivalent weight (g) of the base, an amount (g) of the base being added;

T is an adding period (min);

F is an amount of the liquid circulated per unit period (ml/min); and

L is a logarithmic average (ml) of a maximum amount and a minimum amount of the liquid in this system.

10. A method for producing organic acid crystals comprising the steps of:

converting a part of organic acid crystals into an organic acid salt and dissolving the organic acid salt by adding a base to a liquid containing organic acid crystals, the liquid being obtained by adding an acid to a solution of an organic acid salt;

adding an acid to the organic acid salt dissolved liquid; and isolating the organic acid crystals from the reaction liquid.

11. A method for producing organic acid crystals, comprising the steps of:

precipitating at least a part of total of the organic acid crystals that are precipitable, by adding an acid to a solution of an organic acid salt, so as to obtain a liquid containing the precipitated organic acid crystals;

converting a part of the precipitated organic acid crystals into an organic acid salt and dissolving the organic acid salt, by adding a base to the liquid containing the precipitated organic acid crystals;

adding an acid to the organic acid salt dissolved liquid; and isolating the organic acid crystals from the reaction liquid.

12. A crystallizing apparatus comprising:

a crystallizing-reaction vessel;

an acid supplying section for supplying an acid to the crystallizing-reaction vessel; and a base supplying section for supplying, to the crystallizing-reaction vessel, a base for dissolving a part of crystals precipitated by crystallization in the crystallizing-reaction vessel, the acid supplying section and the base supplying section being so arranged that the acid and the base are respectively supplied to positions of the crystallizing-reaction vessel, the positions being located at a distance from each other.

13. A crystallizing apparatus comprising:

a first reaction vessel having an acid supplying section;

a second reaction vessel having a base supplying section for dissolving, with a base, a part of crystals precipitated by crystallization in the first reaction vessel; and a liquid circulating section connecting the first reaction vessel with the second reaction vessel, the liquid circulating section being for circulating reaction liquid between the first reaction vessel and the second reaction vessel.

* * * * *